(12) United States Patent  
Huang et al.

(10) Patent No.: US 12,457,281 B2
(45) Date of Patent: Oct. 28, 2025

(54) FOLDABLE ELECTRONIC DEVICE

(71) Applicant: SYNCMOLD ENTERPRISE CORP., New Taipei (TW)

(72) Inventors: Chun-Hao Huang, New Taipei (TW); Ching-Hui Yen, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 378 days.

(21) Appl. No.: 18/315,938

(22) Filed: May 11, 2023

(65) Prior Publication Data
US 2023/0421673 A1 Dec. 28, 2023

Related U.S. Application Data

(60) Provisional application No. 63/356,304, filed on Jun. 28, 2022.

(30) Foreign Application Priority Data

Mar. 10, 2023 (TW) .................................. 112108949

(51) Int. Cl.
H04M 1/02 (2006.01)
G06F 1/16 (2006.01)

(52) U.S. Cl.
CPC .......... H04M 1/022 (2013.01); G06F 1/1616 (2013.01); G06F 1/1652 (2013.01); G06F 1/1681 (2013.01); H04M 1/0268 (2013.01)

(58) Field of Classification Search
CPC ..... H04M 1/0266–0269; H04M 1/0206–0222; G06F 1/1681; G06F 1/1652
See application file for complete search history.

(56) References Cited

U.S. PATENT DOCUMENTS

| 10,747,269 | B1 * | 8/2020 | Choi | G06F 1/1652 |
| 10,824,204 | B2 * | 11/2020 | Lin | E05D 11/082 |
| 11,340,661 | B2 * | 5/2022 | Yen | G06F 1/1616 |
| 11,567,543 | B2 * | 1/2023 | Siddiqui | G06F 1/1681 |

(Continued)

FOREIGN PATENT DOCUMENTS

CN 113299195 A 8/2021
CN 215058843 U 12/2021

(Continued)

Primary Examiner — Patrick F Marinelli
(74) Attorney, Agent, or Firm — MUNCY, GEISSLER, OLDS & LOWE, P.C.

(57) ABSTRACT

A foldable electronic device includes a central body, a connecting module, a first wing, a first transmission element, a first panel body, a second wing, a second transmission element, a second panel body, a synchronous engaging module, an elastic module and a flexible screen. The first panel body and the second panel body are capable of switching between an unfolded state and a folded state. When the first panel body and the second panel body are in the unfolded state, a first supporting plate, a second supporting plate and a lifting plate collectively support a flexible section. When the first panel body and the second panel body are in the folded state, the first supporting plate, the second supporting plate and the lifting plate collectively define a yielding space for accommodating the flexible section.

13 Claims, 15 Drawing Sheets

(56) References Cited

U.S. PATENT DOCUMENTS

| | | | |
|---|---|---|---|
| 11,615,720 B2* | 3/2023 | Park | H04M 1/022 |
| | | | 361/679.01 |
| 11,617,277 B2* | 3/2023 | Huang | F16C 11/04 |
| | | | 361/807 |
| 11,669,132 B2* | 6/2023 | Siddiqui | G06F 1/1647 |
| | | | 361/679.27 |
| 11,843,710 B2* | 12/2023 | Huang | H04M 1/0214 |
| 12,093,087 B2* | 9/2024 | Liu | H04M 1/022 |
| 12,222,770 B2* | 2/2025 | Zhang | G06F 1/1616 |
| 12,235,687 B2* | 2/2025 | Siddiqui | G06F 1/1618 |
| 12,287,681 B2* | 4/2025 | Siddiqui | G06F 1/1681 |
| 2021/0263565 A1* | 8/2021 | Yen | G06F 1/1681 |
| 2022/0068167 A1* | 3/2022 | Park | G06F 1/1616 |
| 2022/0100238 A1* | 3/2022 | Siddiqui | G06F 1/1679 |
| 2022/0100239 A1* | 3/2022 | Siddiqui | G06F 1/1618 |
| 2022/0167514 A1* | 5/2022 | Huang | H05K 5/0226 |
| 2022/0407950 A1* | 12/2022 | Huang | H04M 1/0268 |
| 2023/0053947 A1* | 2/2023 | Liu | G06F 1/1652 |
| 2023/0102766 A1* | 3/2023 | Huang | H04M 1/022 |
| | | | 455/575.3 |
| 2023/0168720 A1* | 6/2023 | Siddiqui | G06F 1/1679 |
| | | | 361/679.28 |
| 2023/0221773 A1* | 7/2023 | Zhang | H04M 1/022 |
| | | | 361/679.27 |
| 2023/0266804 A1* | 8/2023 | Siddiqui | G06F 1/1683 |
| | | | 361/679.27 |
| 2023/0319173 A1* | 10/2023 | Huang | F16M 11/2042 |
| | | | 455/566 |
| 2023/0403347 A1* | 12/2023 | Liu | H04M 1/022 |
| 2023/0421673 A1* | 12/2023 | Huang | G06F 1/1652 |
| 2024/0028084 A1* | 1/2024 | Feng | G09F 9/301 |
| 2024/0036607 A1* | 2/2024 | Yen | G06F 1/1681 |
| 2024/0081008 A1* | 3/2024 | Kim | G06F 1/1652 |
| 2024/0094774 A1* | 3/2024 | Yen | H04M 1/0268 |
| 2024/0171663 A1* | 5/2024 | Yen | G06F 1/1681 |
| 2024/0219978 A1* | 7/2024 | Nagai | H04M 1/0237 |
| 2024/0236216 A1* | 7/2024 | Yen | G06F 1/1641 |
| 2024/0430348 A1* | 12/2024 | Park | F16C 11/045 |
| 2025/0004508 A1* | 1/2025 | Park | H04M 1/022 |
| 2025/0016254 A1* | 1/2025 | Taketomi | H04M 1/0216 |
| 2025/0044841 A1* | 2/2025 | Chen | H05K 5/0226 |
| 2025/0053193 A1* | 2/2025 | Choung | G06F 1/1652 |
| 2025/0080633 A1* | 3/2025 | Liao | H04M 1/0268 |
| 2025/0133152 A1* | 4/2025 | Liao | H04M 1/0268 |

FOREIGN PATENT DOCUMENTS

| | | |
|---|---|---|
| CN | 215110042 U | 12/2021 |
| CN | 114263676 A | 4/2022 |

* cited by examiner

FOLDABLE ELECTRONIC DEVICE

CROSS REFERENCE TO RELATED APPLICATION

This application claims the benefit of U.S. Provisional Application Ser. No. 63/356,304 filed on Jun. 28, 2022, and the benefit of Taiwan Patent Application Ser. No. 112108949 filed on Mar. 10, 2023. The entirety of each Application is incorporated herein by reference.

BACKGROUND OF THE INVENTION

1. Field of the Invention

The present invention relates to a foldable electronic device, especially a foldable electronic device with a flexible screen and with two linkage structures, being able to synchronously pivot, on left and right sides respectively.

2. Description of Related Art

Currently, foldable electronic devices are becoming increasingly popular on the market, which comprise conventional structures such as flexible display screens and hinge mechanisms. By cooperating with multiple linkage structures, lifting plates and support plates in a coordinated manner, foldable electronic devices are able to switch between unfolded and folded states, allowing the flexible display screen to be flattened or bent. However, conventional foldable electronic devices encounter issues such as insufficient support force for the flexible display screen in the unfolded state, insufficient yielding space for the flexible display screen in the folded state, or asynchronous and unsmooth operation during the switching between the unfolded and folded states.

In view of the above, the present invention provides a foldable electronic device that ensures and gives consideration to support force, yielding space and synchronous folding and unfolding.

SUMMARY OF THE INVENTION

An objective of the present disclosure is to provide a foldable electronic device, which is different from those conventional ones with existing hinge structures. The present invention applies symmetrically coordinated four-bar linkage structures in conjunction with transmission elements, wing elements, support plates, and multiple actuation modules. By means of cooperating between arc-shaped grooves and arc-shaped sliders respectively, and by utilizing a synchronous engaging module, a flexible screen is able to switch between a flattened state and a bent state with better smoothness. In addition, through coordination of components, a central support force of the flexible screen is increased in an unfolded state. When switching to a folded state, a supporting plate is pressed by protruding portions and magnetically attracted by magnets, to ensure a yielding space in the folded status meeting requirements of durability and smoothness for users to operate the foldable electronic device.

To achieve the above object, the present invention provides a foldable electronic device, which comprises a central body, a connecting module, a first wing, a first transmission element, a first panel body, a second wing, a second transmission element, a second panel body, a synchronous engaging module, an elastic module and a flexible screen. The central body includes a main body portion, a lifting plate, at least one first inner arc-shaped slider and at least one second inner arc-shaped slider, wherein the first inner arc-shaped slider and the second inner arc-shaped slider are respectively formed in the main body portion by intervals, and the lifting plate is movably arranged in the main body portion and movable between a highest position and a lowest position. The connecting module is arranged in the central body and includes a first shaft rod and a second shaft rod respectively inserted into the main body portion, wherein the first shaft rod extends along a first axis and has a first main gear, and the second shaft rod extends along a second axis and has a second main gear. The first wing includes a first support plate, at least one first inner arc-shaped groove and at least one first outer arc-shaped groove, wherein the first support plate is movably arranged on one side of the lifting plate, and the first inner arc-shaped slider is slidably arranged in the first inner arc-shaped groove, so that the first wing is pivotable relative to the main body portion with a first inner virtual axis as a center. The first transmission element is sleeved on the first shaft rod and synchronously rotates with the first shaft rod. The first panel body includes a first bearing element capable of linear sliding relative to the first transmission element and having at least one first outer arc-shaped slider, wherein the outer arc-shaped slider is slidably arranged in the first outer arc-shaped groove, thereby allowing the first bearing element to pivot relative to the first wing about a first outer virtual axis. The second wing includes a second support plate, at least one second inner arc-shaped groove and at least one second outer arc-shaped groove, wherein the second support plate is movably arranged on the opposite side of the lifting plate, and the second inner arc-shaped slider is slidably arranged in the second inner arc-shaped groove, so that the second wing is pivotable relative to the main body portion with a second inner virtual axis as a center. The second transmission element is sleeved on the second shaft rod and synchronously rotating with the second shaft rod. The second panel body includes a second bearing element capable of linear sliding relative to the second transmission element and having at least one second outer arc-shaped slider, wherein the second outer arc-shaped slider is slidably arranged in the second outer arc-shaped groove, thereby allowing the second bearing element to pivot relative to the second wing about a second outer virtual axis. The synchronous engaging module includes a synchronous supporting block, a first auxiliary gear and a second auxiliary gear, wherein two ends of the synchronous supporting block are respectively sleeved on the first shaft rod and the second shaft rod, and the first and second auxiliary gears are reversely rotatably disposed on the synchronous supporting block and mesh with each other, and wherein the first auxiliary gear meshes with the first main gear in a reversely rotatable manner, and the second auxiliary gear meshes with the second main gear in a reversely rotatable manner, thereby enabling the first transmission element and second transmission element to synchronously and reversely rotate. The elastic module includes a pushing element slidably sleeved on the first shaft rod and the second shaft rod and movably engaged with the first transmission element and the second transmission element. The flexible screen is disposed on the first panel body and the second panel body and including a bendable area. The first panel body and the second panel body are capable of switching between an unfolded state and a folded state, wherein when the first panel body and the second panel body are in the unfolded state, the flexible screen is flattened, the lifting plate is at the highest position, and the first support plate, the second support plate, and the lifting plate jointly support the bendable area, and wherein when the first panel body and the second panel body are in the folded state, the flexible screen is bent, the lifting plate is at the lowest position, and the first support plate, the second support plate, and the lifting plate jointly define a yielding space for accommodating the bendable area.

In one embodiment, when the first panel body and the second panel body are in the unfolded state, the first support plate and the second support plate are substantially coplanar with the lifting plate; and when the first panel body and the second panel body are in the folded state, the first panel body and the second panel body are substantially parallel to and spaced apart from each other, and the first support plate and the second support plate are not parallel to the lifting plate so as to collectively define the yielding space.

In one embodiment, when the first panel body and the second panel body are switched from the unfolded state to the folded state, the first wing and the second wing rotate relative to the main body portion about the first inner virtual axis and the second inner virtual axis at a first angle respectively, and the first panel body and the second panel body rotate relative to the main body portion at a second angle respectively, and wherein the first angle is greater than the second angle.

In one embodiment, the first bearing element further has a first extending plate and a first sliding column, and the first transmission element includes a first receiving groove extending substantially perpendicular to the first axis, and the first extending plate and the first sliding column are extending along the first axis and slidably disposed in the first receiving groove; and wherein the second bearing element further has a second extending plate and a second sliding column, the second transmission element has a second receiving groove extending substantially perpendicular to the second axis, and the second extending plate and the second sliding column are extending along the second axis and slidably disposed in the second receiving groove.

In one embodiment, the connecting module further includes a fixing element, a first ear portion and a second ear portion laterally and oppositely extending from the fixing element, the first ear portion is formed with a first shaft hole along the first axis for the first shaft rod to pass through, and the second ear portion is formed with a second shaft hole along the second axis for the second shaft rod to pass through.

In one embodiment, the pushing element has a first driven cam and a second driven cam sleeved on the first shaft rod and the second shaft rod respectively, and the elastic module further includes a first elastic element and a second elastic element sleeved on the first shaft rod and the second shaft rod respectively, and wherein two ends of the first elastic element abut the first ear portion and first driven cam severally, and two ends of the second elastic element abut the second ear portion and the second driven cam severally.

In one embodiment, the first transmission element further includes a first driving cam slidably sleeved along the first axis on the first shaft rod and able to rotate synchronously with the first shaft rod, and the second transmission element further includes a second driving cam slidably sleeved along the second axis on the second shaft rod and able to rotate synchronously with the second shaft rod, wherein the first driving cam and the second driving cam respectively mate with the first driven cam and the second driven cam, and wherein when the first bearing element and the second bearing element are in a half-folded state between the unfolded state and the folded state, the first driving cam and the second driving cam abut against the first driven cam and the second driven cam, respectively, thereby compressing the first elastic element and the second elastic element, and when the first bearing element and the second bearing element are in the unfolded state or in the folded state, the first elastic element and second elastic element are correspondingly released.

In one embodiment, the lifting plate further has a locking element, a nut and a screw hole, the central body further includes a stopper portion, the nut is disposed inside the central body, and the locking element passes through the screw hole and is screwed into the nut, and wherein when the lifting plate is lifted to the highest position relative to the central body, the nut interferes with the stopper portion.

In one embodiment, the first elastic element and the second elastic element are compression springs.

In one embodiment, the first support plate and the second support plate have at least one first protruding portion and at least one second protruding portion respectively, and the lifting plate further has at least one first recess and at least one second recess, wherein the first recess corresponds to the first protruding portion and the second recess corresponds to the second protruding portion, and wherein when the first panel body and the second panel body switch from the unfolded state to the folded state, the first protruding portion and the second protruding portion are able to abut against the first recess and the second recess, respectively, for compressing the lifting plate, so as to keep the lifting plate at the lowest position.

In one embodiment, the first support plate further has at least one first abutting portion, and the second support plate further has at least one second abutting portion, and wherein when the first bearing element and the second bearing element are in the unfolded state, the first abutting portion, the second abutting portion, the first wing and the second wing collectively lift the lifting plate to the highest position.

In one embodiment, the synchronous engaging module further includes at least one magnet disposed on the synchronous support block and constantly providing a magnetic attraction force to the lifting plate, thereby making the lifting plate tend to settle towards the lowest position.

In one embodiment, the first axis, the first outer virtual axis, the first inner virtual axis, the second axis, the second outer virtual axis, and the second inner virtual axis are all parallel to each other.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
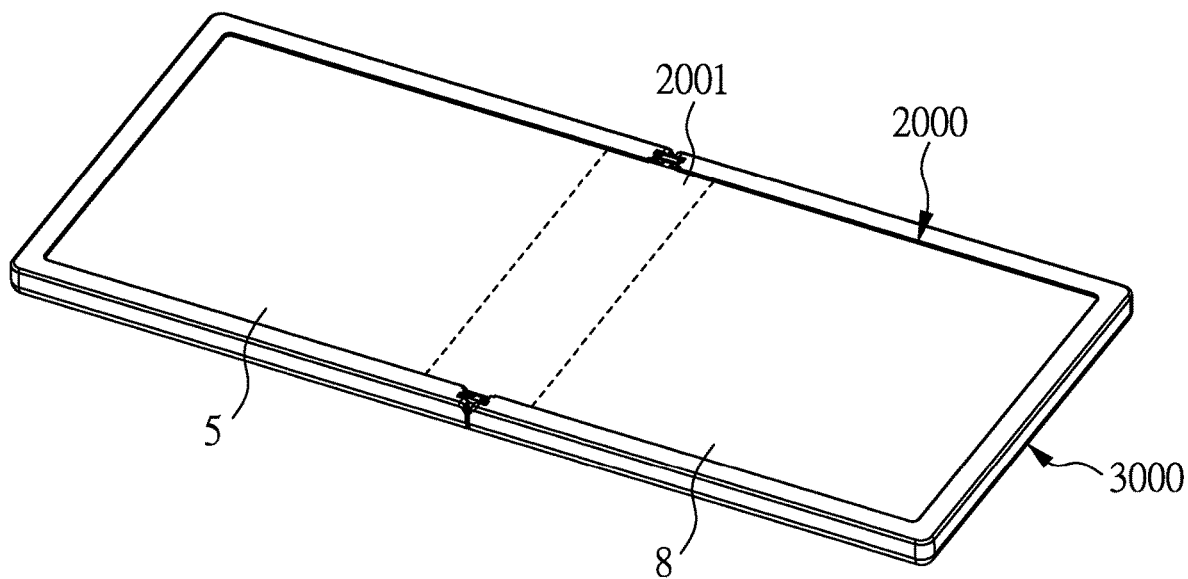
FIG. 1 is a schematic view of the foldable electronic device in the unfolded state according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
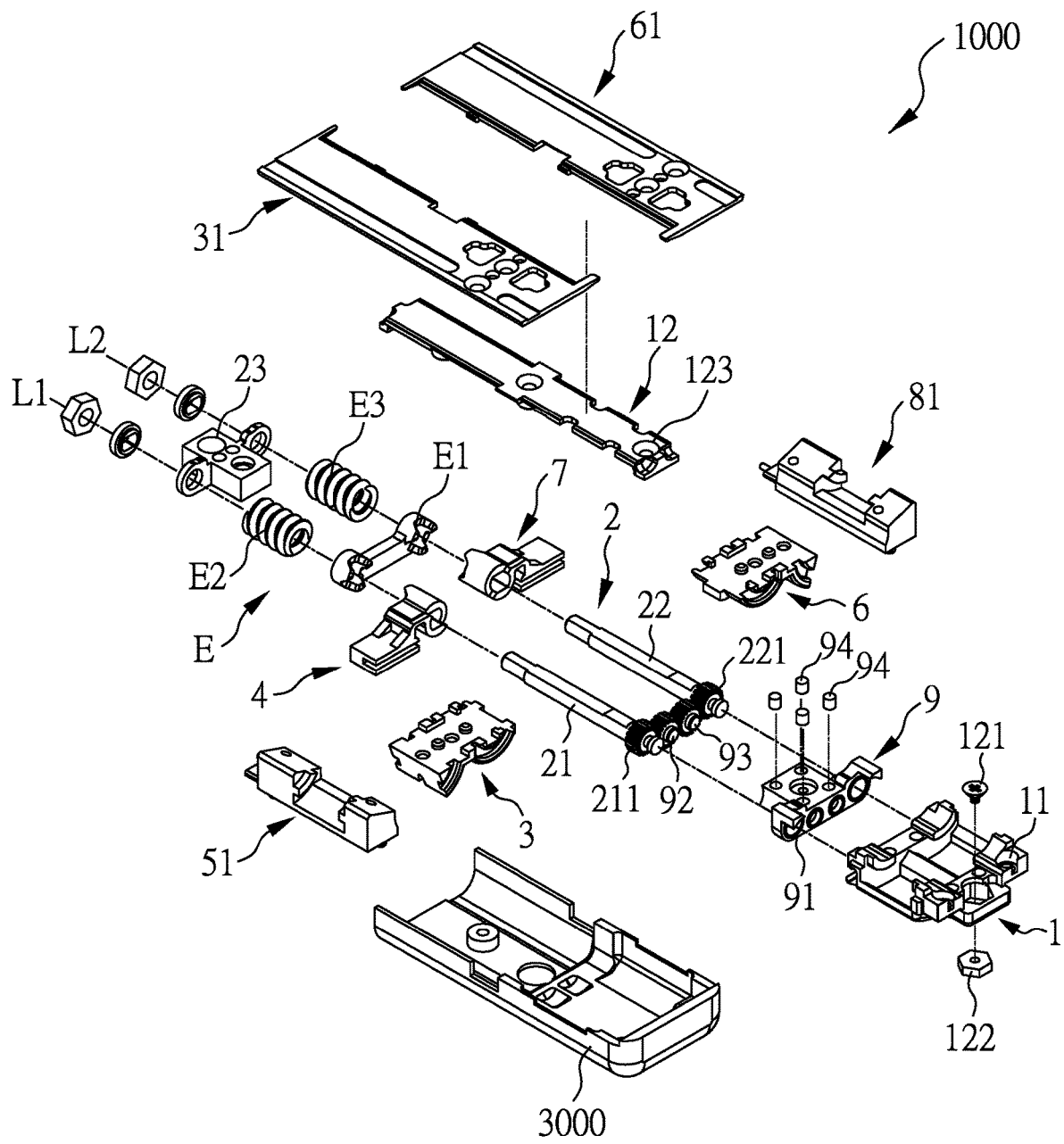
FIG. 2 is a partial exploded view of the foldable electronic device according to the present invention.
Figure 3:
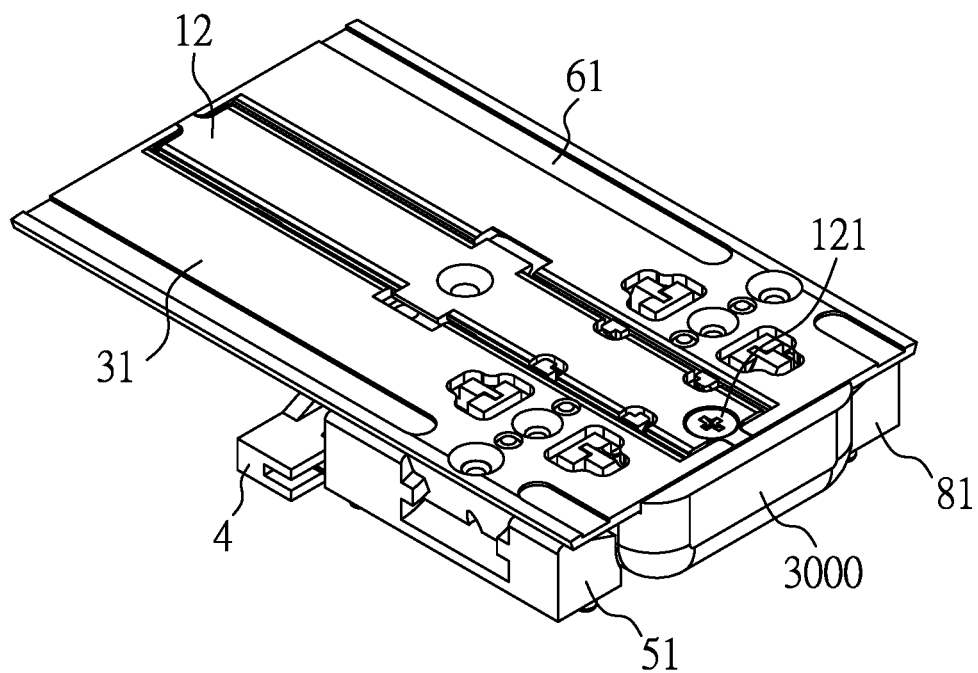
FIG. 3 is a partial schematic view of the foldable electronic device in the unfolded state according to the present invention.
Figure 4:
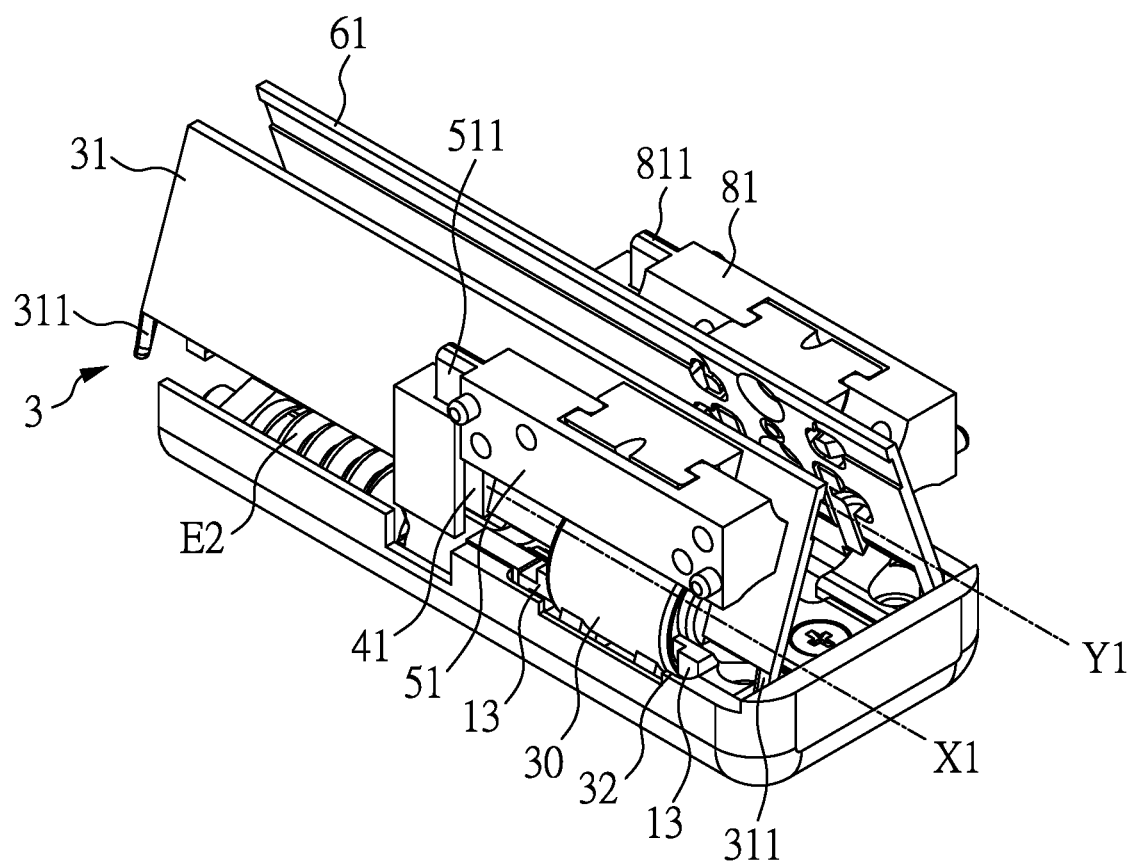
FIG. 4 is a partial schematic view of the foldable electronic device in the folded state according to the present invention.

First, please refer to FIG. 1 to FIG. 4. FIG. 1 illustrates a schematic view of an embodiment of the foldable electronic device 1000 in an unfolded state according to the present invention. FIG. 2 is a partial exploded view of the embodiment of the foldable electronic device 1000 according to the present invention. FIG. 3 and FIG. 4 respectively show partial schematic views of the foldable electronic device 1000 in the unfolded state and in the folded state according to the present invention. The foldable electronic device 1000 comprises a central body 1, a connecting module 2, a first wing 3, a first transmission element 4, a first panel body 5, a second wing 6, a second transmission element 7, a second panel body 8, a synchronous engaging module 9, an elastic module E, a flexible screen 2000, and a housing 3000. Wherein, the flexible screen 2000 is disposed on the first panel body 5 and the second panel body 8, and includes a bendable area 2001.

Figure 5:
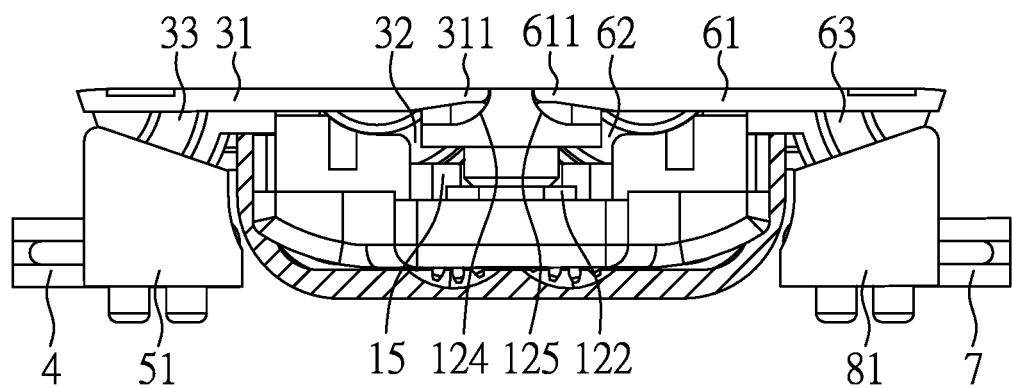
FIG. 5 is a partial sectional view of the foldable electronic device in the unfolded state according to the present invention.
Figure 6:
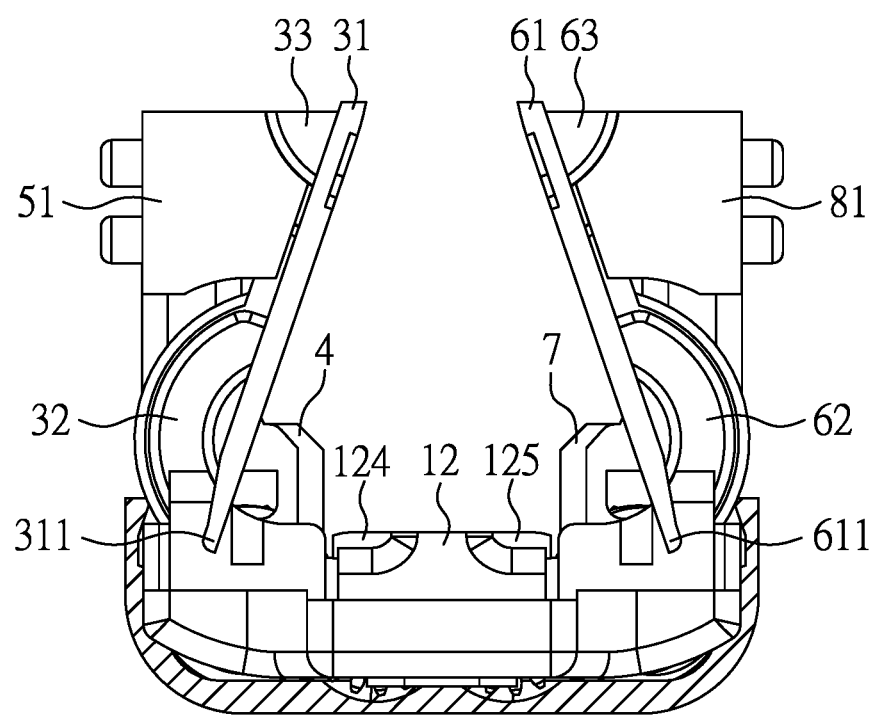
FIG. 6 is a partial sectional view of the foldable electronic device in the folded state according to the present invention.
Figure 7:
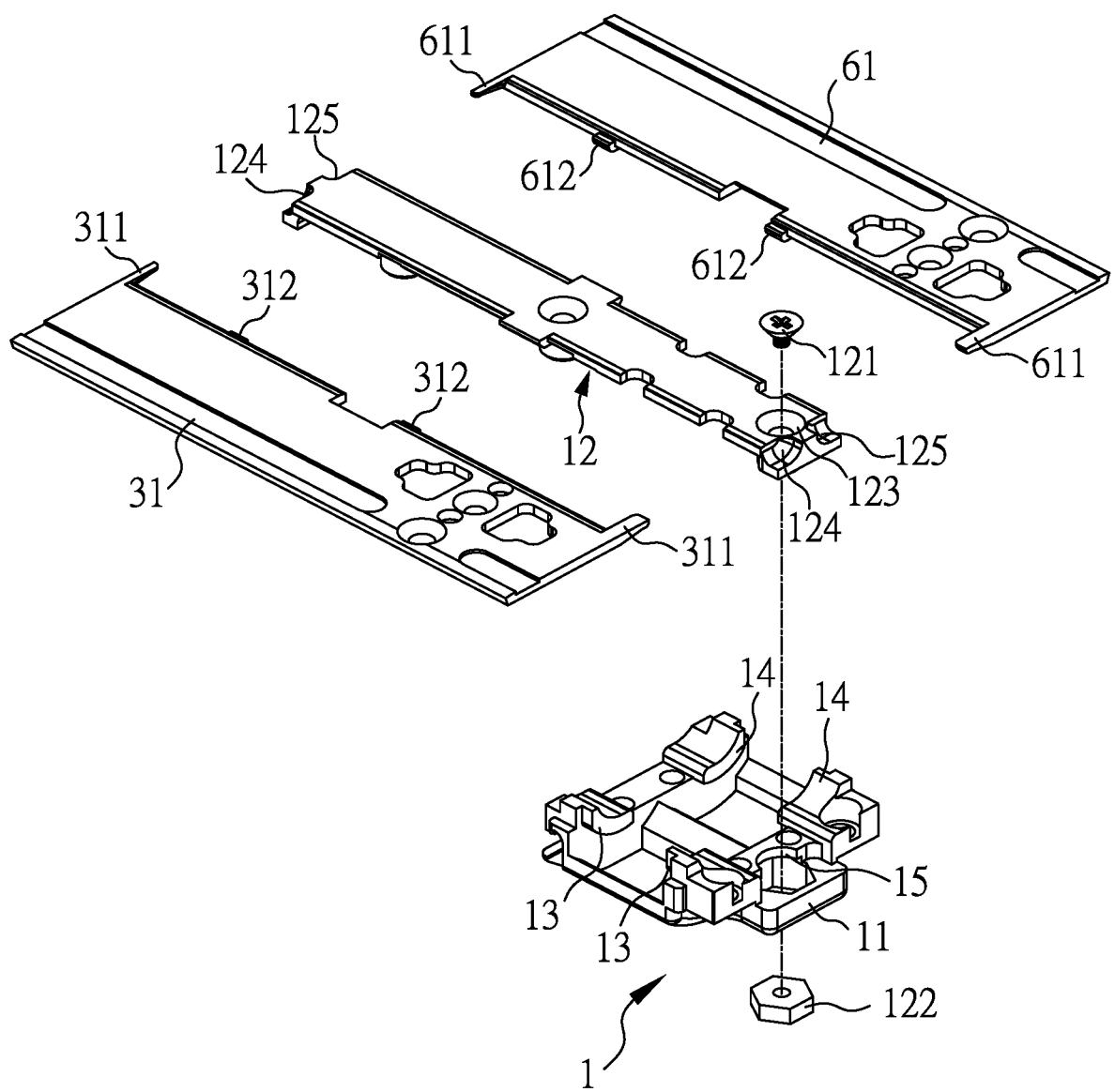
FIG. 7 is an exploded view of the central body, the first support plate and second support plate according to the present invention.

Reference is also made to FIG. 5 to FIG. 7. The central body 1 includes a main body portion 11, a lifting plate 12, two first inner arc-shaped sliders 13, two second inner arc-shaped sliders 14, and a stopper portion 15. The main body portion 11 is configured inside the housing 3000, and the first inner arc-shaped sliders 13 are formed by intervals on one side of the main body portion 11, while the second inner arc-shaped sliders 14 are formed by intervals on the other side of the main body portion 11. The lifting plate 12 is movably arranged in the main body portion 11 and movable between a highest position (as shown in FIG. 5) and a lowest position (as shown in FIG. 6). In addition, the stopper portion 15 is formed on the main body portion 11.

The lifting plate 12 further includes a locking element 121, a nut 122, a screw hole 123, two first recesses 124, and two second recesses 125. The nut 122 is disposed inside the central body 1, and the locking element 121 passes through the screw hole 123 and is screwed into the nut 122. The first recesses 124 are symmetrically formed on one side of the lifting plate 12, and the second recesses 125 are symmetrically formed on the other side of the lifting plate 12. When the lifting plate 12 is lifted to the highest position relative to the main body portion 11, the nut 122 interferes with the stopper portion 15, allowing the lifting plate 12 restrictedly keeping at the highest position. Conversely, when the lifting plate 12 drops to the lowest position relative to the main body portion 11, the nut 122 does not interfere with the stopper portion 15.

Figure 9:
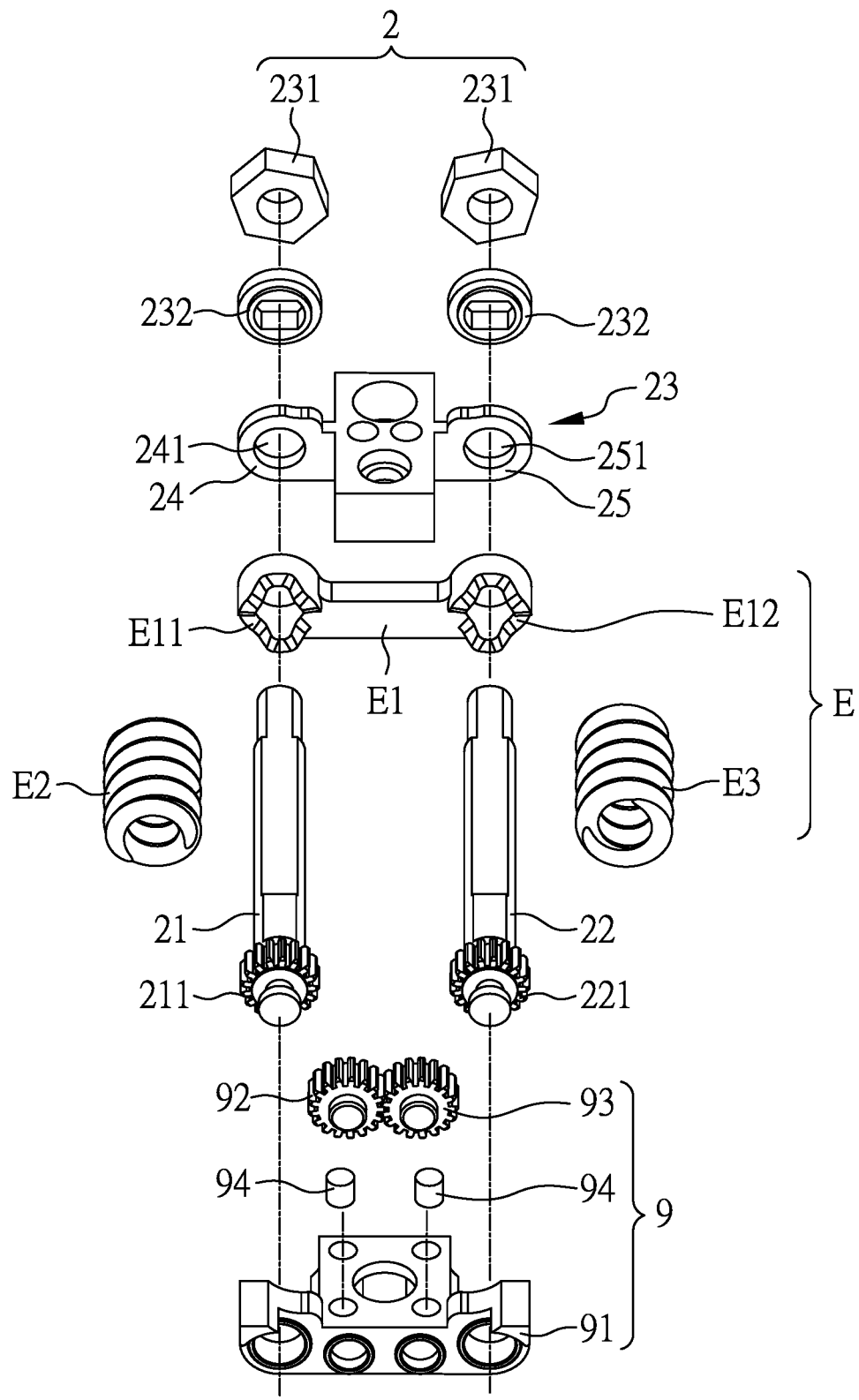
FIG. 9 is an exploded view of the connecting module, synchronous engaging module and elastic module according to the present invention.

In this embodiment, the connecting module 2 is arranged in the central body 1, as shown in FIG. 9. The connecting module 2 includes a first shaft rod 21, a second shaft rod 22, a fixing element 23, a first ear portion 24, and a second ear portion 25. The first shaft rod 21 and the second shaft rod 22 are respectively inserted into the main body portion 11. The first shaft rod 21 extends along a first axis L1 and has a first main gear 211, and the second shaft rod 22 extends along a second axis L2 and has a second main gear 221. One end of the first shaft rod 21 and one end of the second shaft rod 22 are located in the synchronous engaging module 9, so that the first main gear 211 and the second main gear 221 are spaced apart respectively in the synchronous engaging module 9. The first ear portion 24 and the second ear portion 25 laterally and oppositely extend from the fixing element 23. The first ear portion 24 is formed with a first shaft hole 241 along the first axis L1 for the first shaft rod 21 to pass through, and the second ear portion 25 is formed with a second shaft hole 251 along the second axis L2 for the second shaft rod 22 to pass through. In addition, the fixing element 23 includes two connecting nuts 231 and two washers 232. The connecting nuts 231 and the washers 232 are respectively coupled and sleeved on the first shaft rod 21 and the second shaft rod 22, to fix the first shaft rod 21 and the second shaft rod 22 to the fixing seat 23.

Figure 8:
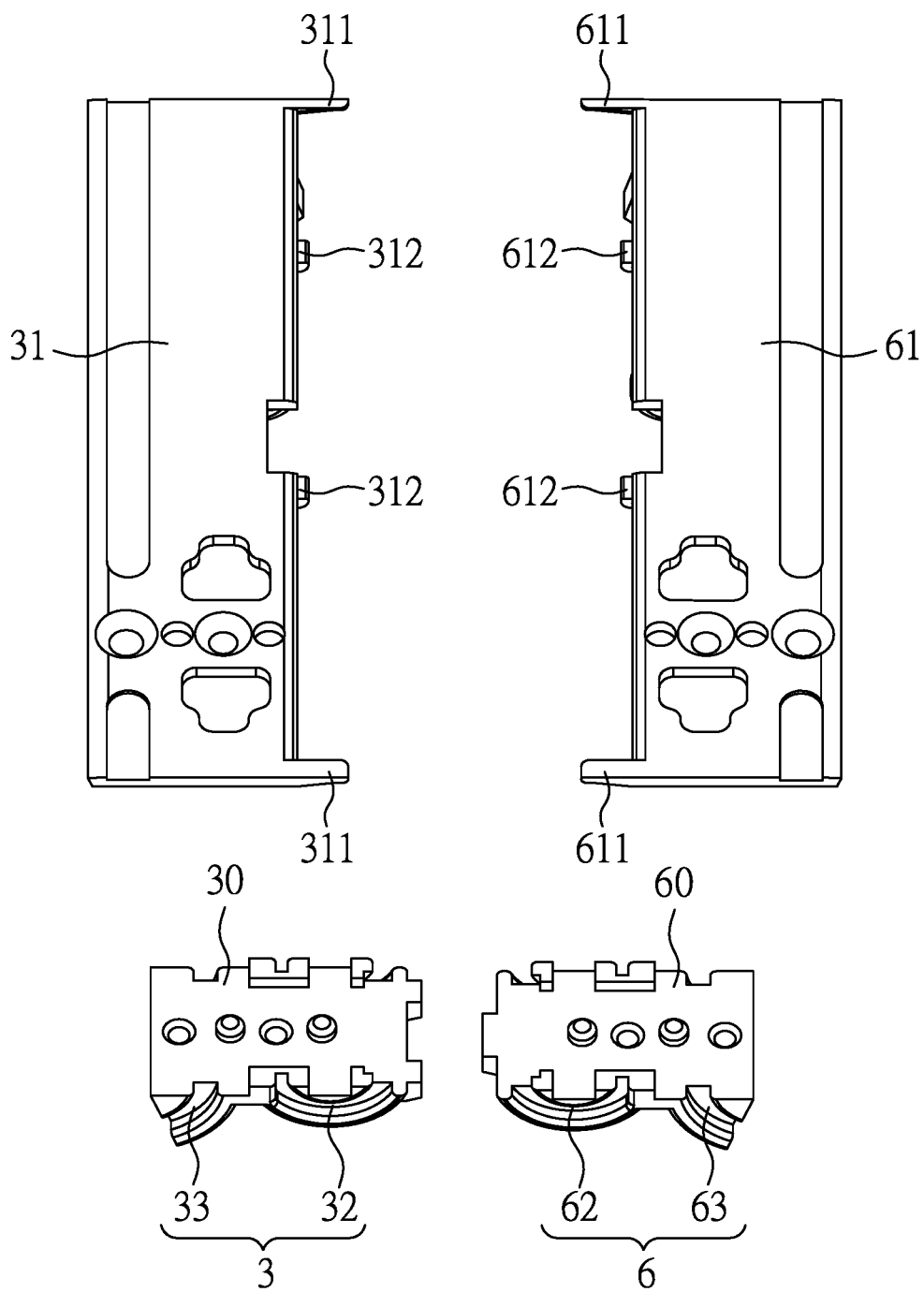
FIG. 8 is a schematic view of the first wing and second wing according to the present invention.

Next, the details of the pivot structure on one side will be described. Please refer to FIG. 8. The first wing 3 includes a first body 30, a first support plate 31, two first inner arc-shaped grooves 32 and two first outer arc-shaped grooves 33. The first support plate 31 is fixed to the first body 30 and movably arranged on one side of the lifting plate 12. The first inner arc-shaped grooves 32 and the first outer arc-shaped grooves 33 are formed in pairs on both sides of the first body 30 respectively. The first inner arc-shaped sliders 13 of the central body 1 are slidably arranged in the first inner arc-shaped grooves 32 respectively, enabling the first wing 3 to pivot relative to the main body portion 11 with a first inner virtual axis X1 as a center. Moreover, the first support plate 31 has two first protruding portions 311 and two first abutting portions 312. The first protruding portions 311 and the first abutting portions 312 are formed on the same side (i.e., the side adjacent to the lifting plate 12) of the first support plate 31 at intervals. The first recesses 124 of the lifting plate 12 correspond to the first protruding portions 311 for mutually operating during switching between the unfolded state and the folded state. In this embodiment, the number of the first protruding portions 311 and the first abutting portions 312 are respectively two, as an example for considering the purpose of supporting stability, but the number can be adjusted according to actual needs, without limitation herein.

The first transmission element 4 comprises a first driving cam 41 and a first receiving groove 42. The first driving cam 41 is a hollow end-cam sleeved on the first shaft rod 21 and is able to slide along the first axis L1 and to rotate synchronously with the first shaft rod 21. The first receiving groove 42 extends substantially perpendicular to the first axis L1 and is disposed inside the first transmission element 4.

Figure 10:
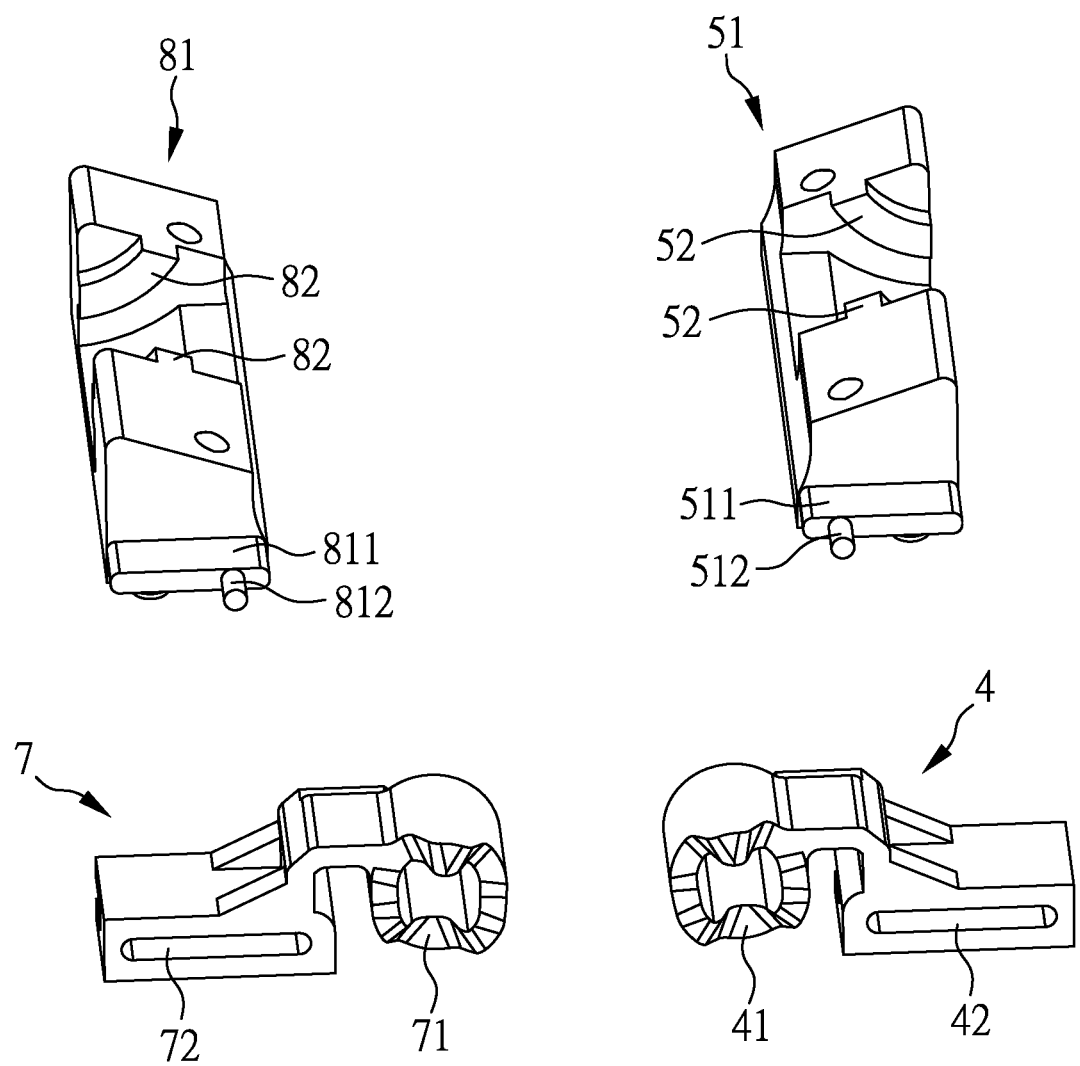
FIG. 10 is a schematic view of the first transmission element, first bearing element, second transmission element and second bearing element according to the present invention.
Figure 12:
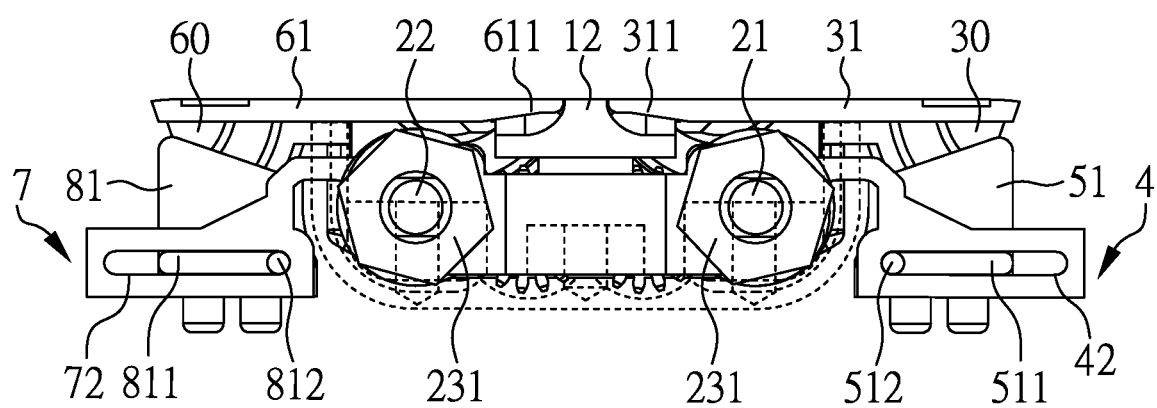
FIG. 12 is another partial sectional view of the foldable electronic device in the unfolded state according to the present invention.
Figure 13:
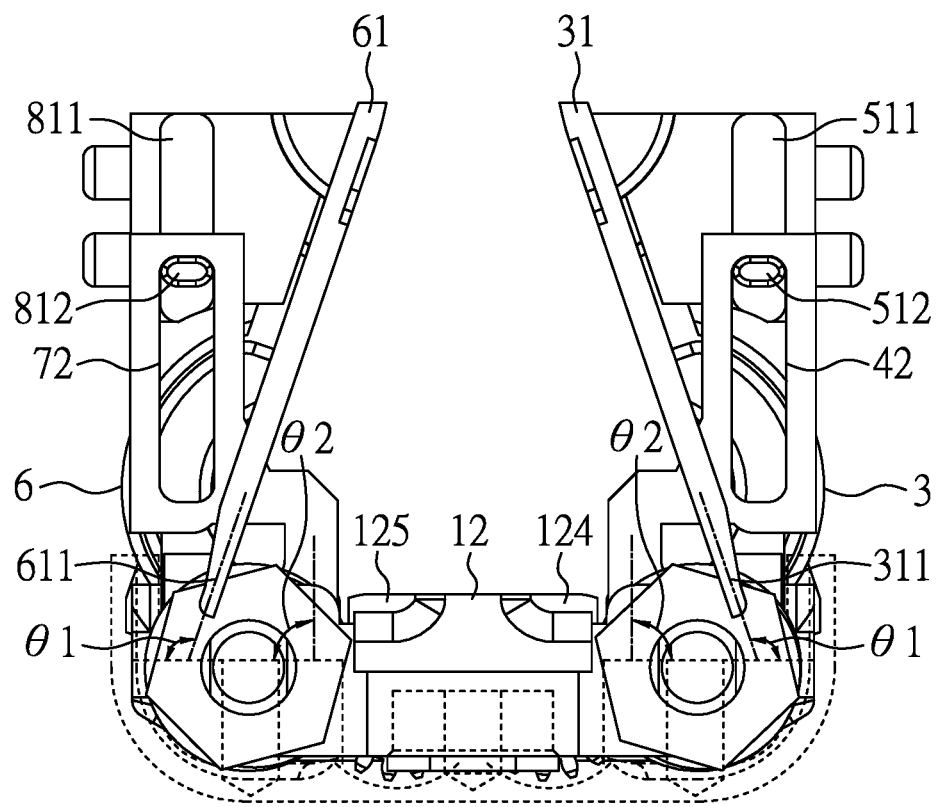
FIG. 13 is another partial sectional view of the foldable electronic device in the folded state according to the present invention.
Figure 15:
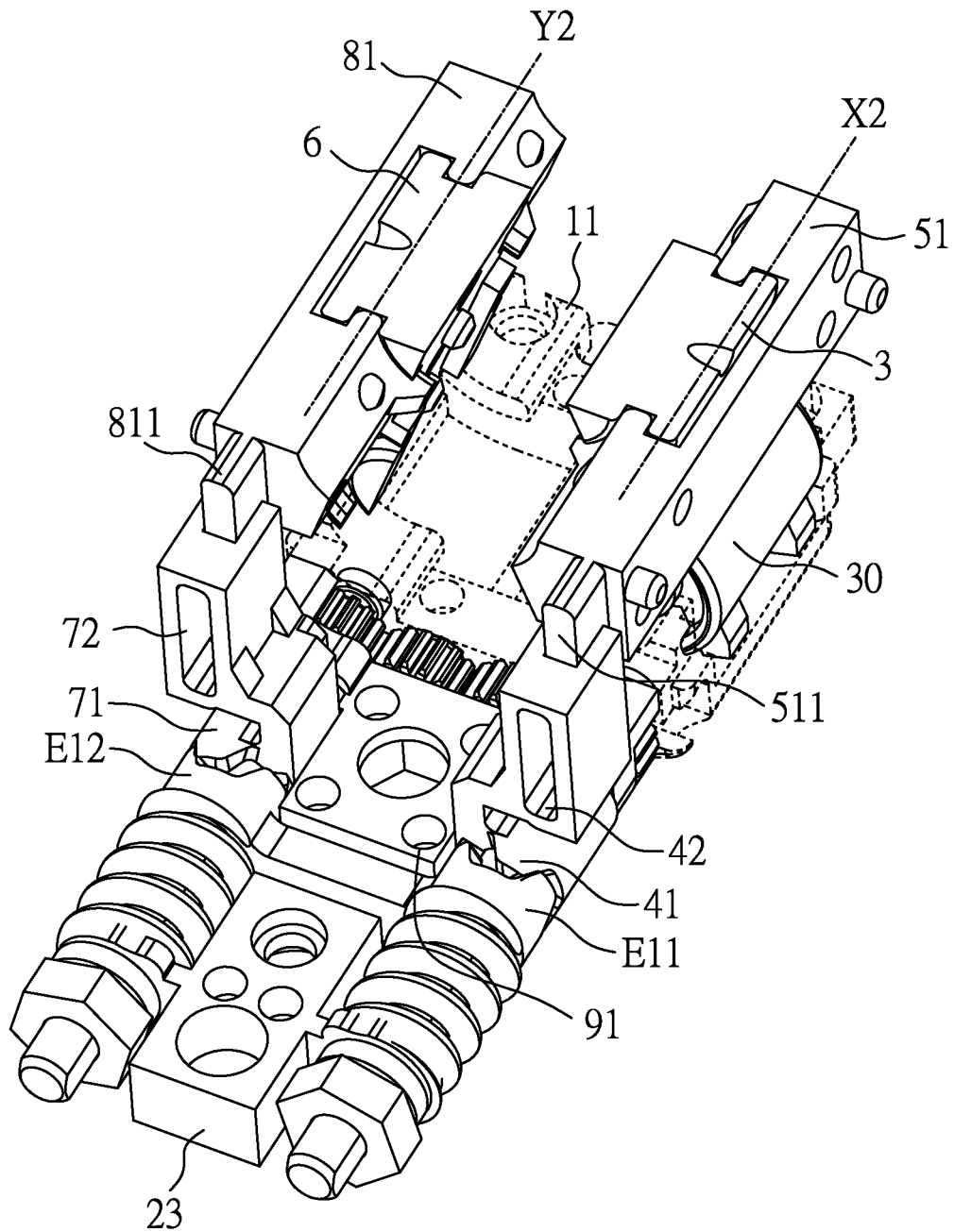
FIG. 15 is another partial schematic view showing the operation of the foldable electronic device according to the present invention.

Referring to FIG. 2, FIG. 10, and FIG. 15 together, the first panel body 5 comprises a first bearing element 51 and two first outer arc-shaped sliders 52. The first bearing element 51 is capable of sliding linearly relative to the first transmission element 4, and the first outer arc-shaped sliders 52 are slidably arranged in the first outer arc-shaped grooves 33 of the first wing 3 respectively, allowing the first bearing element 51 to pivot relative to the first wing 3 about a first outer virtual axis X2. Specifically, the first bearing element 51 includes a first extending plate 511 and a first sliding column 512. The first extending plate 511 and the first sliding column 512 extend along the first axis L1 and are slidably disposed in the first receiving groove 42 of the first transmission element 4. The first extending plate 511 and the first sliding column 512 slide back and forth in the first receiving groove 42. In other words, when the first panel body 5 is in an unfolded state, the first extending plate 511 and the first sliding column 512 are farthest away from the central body 1 relative to the first transmission element 4 (as shown in FIG. 12). When the first panel body 5 is in a folded state, the first extending plate 511 and the first sliding column 512 are closest to the central body 1 relative to the first transmission element 4 (as shown in FIG. 13).

Then, the details of the pivot structure on the other side will be described. Please refer to FIG. 4 and FIG. 8. The second wing 6 comprises a second body 60, a second support plate 61, two second inner arc-shaped grooves 62 and two second outer arc-shaped grooves 63. The second support plate 61 is fixed to the second body 60 and movably arranged on the opposite side of the lifting plate 12 (relative to the first support plate 31). The second inner arc-shaped grooves 62 and the second outer arc-shaped grooves 63 are formed in pairs on both sides of the second body respectively. The second inner arc-shaped sliders 14 of the central body 1 are slidably arranged in the second inner arc-shaped grooves 62 respectively, allowing the second wing 6 to pivot relative to the main body portion 11 with a second inner virtual axis Y1 as a center. Additionally, the second support plate 61 has two second protruding portions 611 and two second abutting portions 612. The second protruding portions 611 and the second abutting portions 612 are formed on the same side (i.e., the side adjacent to the lifting plate 12) of the second support plate 61 at intervals. The second recesses 125 of the lifting plate 12 correspond to the second protruding portions 611 for mutually operating during switching between the unfolded state and folded state. In this embodiment, the number of second protruding portions 611 and second abutting portions 612 are respectively two, as an example for considering the purpose of supporting stability, but the number can be adjusted according to actual needs, without limitation herein.

In this embodiment, the second transmission element 7 comprises a second driving cam 71 and a second receiving groove 72. The second driving cam 71 is a hollow end-cam sleeved on the second shaft rod 22 and is able to slide along the second axis L2 and to rotate synchronously with the second shaft rod 22. The second receiving groove 72 extends substantially perpendicular to the second axis L2 and is disposed inside the second transmission element 7.

As shown in FIG. 2, FIG. 10 and FIG. 15, in this embodiment, the second panel body 8 comprises a second bearing element 81 and two second outer arc-shaped sliders 82. The second bearing element 81 is capable of sliding linearly relative to the second transmission element 7, and the second outer arc-shaped sliders 82 are slidably arranged in the second outer arc-shaped groove 63 of the second wing 6 respectively, allowing the second bearing element 81 to pivot relative to the second wing 6 about a second outer virtual axis Y2. Specifically, the second bearing element 81 includes a second extending plate 811 and a second sliding column 812. The second extending plate 811 and the second sliding column 812 extend along the second axis L2 and are slidably disposed in the second receiving groove 72 of the second transmission element 7. The second extending plate 811 and the second sliding column 812 slide back and forth in the second receiving groove 72. In other words, when the second panel body 8 is in an unfolded state, the second extending plate 811 and the second sliding column 812 are farthest away from the central body 1 relative to the second transmission element 7 (as shown in FIG. 12). When the second panel body 8 is in a folded state, the second extending plate 811 and the second sliding column 812 are closest to the central body 1 relative to the second transmission element 7 (as shown in FIG. 13).

The transformation of the first panel body 5 and the second panel body 8 between the unfolded and folded states is described as below. When the first panel body 5 and the second panel body 8 are in the unfolded state, the flexible screen 2000 is flattened, the lifting plate 12 is at the highest position, and the first support plate 31, the second support plate 61, and the lifting plate 12 jointly support the bendable area 2001. When the first panel body 5 and the second panel body 8 are in the folded state, the flexible screen 2000 is bent, the lifting plate 12 is at the lowest position, and the first support plate 31, the second support plate 61, and the lifting plate 12 jointly define a yielding space.

In detail, when the first panel body 5 and the second panel body 8 are in the unfolded state, the first wing 3, the second wing 6, the first abutting portion 312 and the second abutting portion 612 jointly lift the lifting plate 12 to the highest position and make he lifting plate 12 away from the main body portion 11. At this time, the first support plate 31 and the second support plate 61 are substantially coplanar with the lifting plate 12, and jointly support the bendable area 2001. Conversely, when the first panel body 5 and the second panel body 8 switch from the unfolded state to the folded state, the first protruding portions 311 of the first wing 3 and the second protruding portions 611 of the second wing 6 are able to respectively abut against the first recesses 124 and the second recesses 125, for compressing the lifting plate 12 downwards. As the lifting plate 12 is at the lowest position, the first panel body 5 and the second panel body 8 are substantially parallel to and spaced apart from each other, and the first support plate 31 and the second support plate 61 are not parallel to the lifting plate 12, so as to collectively define the yielding space for accommodating the bendable area 2001.

In this embodiment, stoppers can be additionally provided on the first outer arc-shaped grooves 33 of the first wing 3 and the second outer arc-shaped grooves 63 of the second wing 6, respectively. When the first panel body 5 and the second panel body 8 are in the folded state, the stoppers interfere with the housing 3000, to prevent the arc-shaped sliders from derailing while sliding on the arc-shaped grooves, and to generate a stopping and limiting function.

Figure 11:
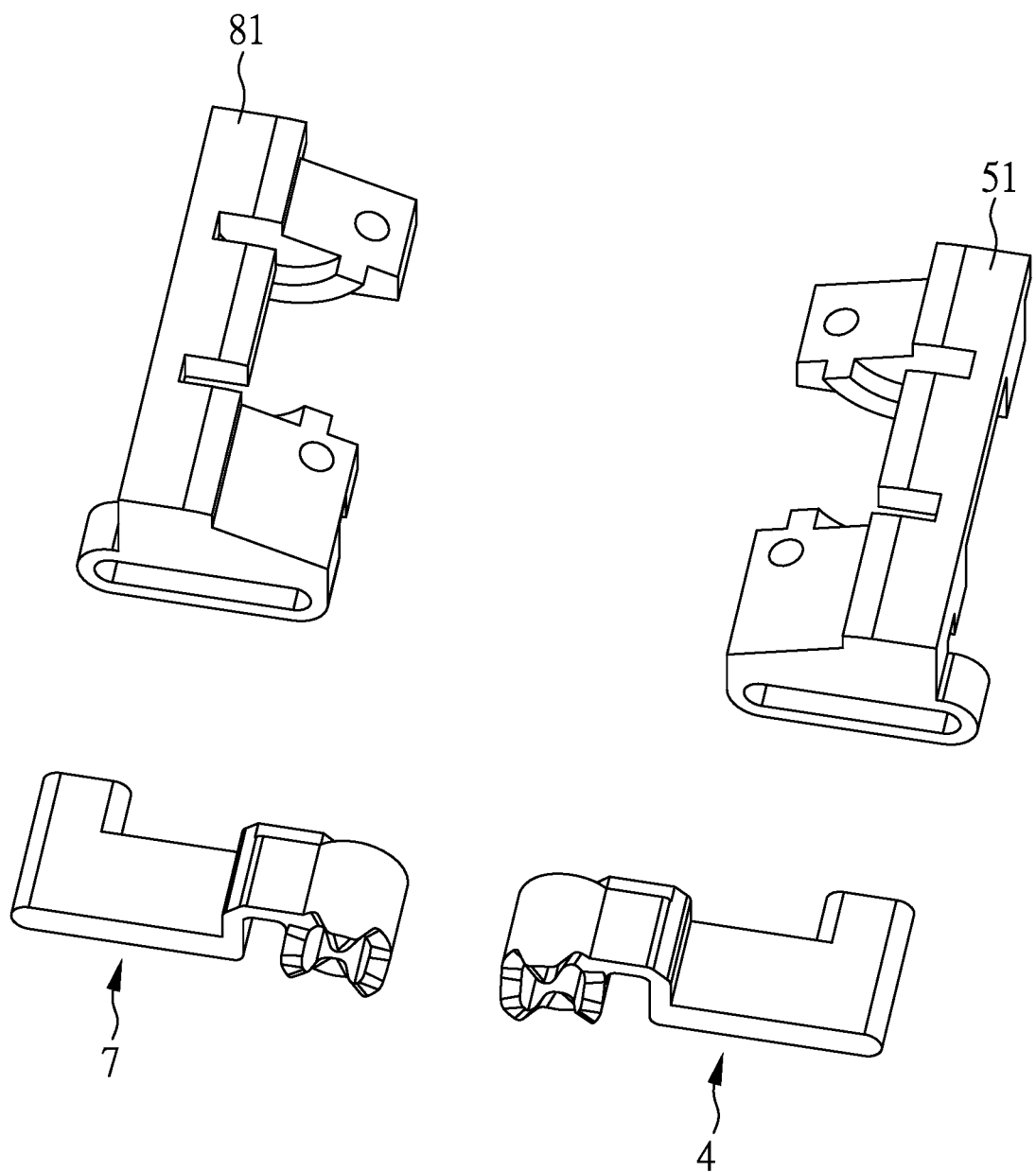
FIG. 11 is a schematic view of another embodiment of the first transmission element, first bearing element, second transmission element and second bearing element according to the present invention.

In another embodiment of the present invention, the configurations of the first bearing element 51 being slidably disposed on the first transmission element 4 and of the second bearing element 81 being slidably disposed on the second transmission element 7 can be reversely arranged, as shown in FIG. 11. The first bearing element 51 may include a receiving groove structure, and the first transmission element 4 may comprise an extending plate structure slidably disposed in the receiving groove structure. The second bearing element 81 may include a receiving groove structure, and the second transmission element 7 may include an extending plate structure slidably disposed in the receiving groove structure. This arrangement can also achieve the effect of mutual sliding when pivoting.

Furthermore, the synchronous engaging module 9 comprises a synchronous support block 91, a first auxiliary gear 92, a second auxiliary gear 93 and four magnets 94. The two ends of the synchronous support block 91 are respectively sleeved on the first shaft rod 21 and the second shaft rod 22. The first auxiliary gear 92 and the second auxiliary gear 93 are reversely and rotatably disposed on the synchronous support block 91, and the first auxiliary gear 92 and the second auxiliary gear 93 are meshed with each other. The first auxiliary gear 92 engages reversely with the first main gear 211, and the second auxiliary gear 93 engages reversely with the second main gear 221, so that the first transmission element 4 and the second transmission element 7 are able to rotate synchronously and reversely. In addition, the magnets 94 are disposed in the synchronous support block 91. When the first panel body 5 and the second panel body 8 are switched from the unfolded state to the folded state, the first protruding portions 311 and the second protruding portions 611 press down into the first recesses 124 and the second recesses 125, respectively, causing the lifting plate 12 to settle towards the lowest position. At the same time, the magnets 94 can provide a magnetic attraction force to the lifting plate 12, causing the lifting plate 12 more likely to approach the lowest position and to attach to the main body portion 11, so as to form a yielding space for the bendable area 2001 of the flexible screen 2000. In this embodiment, considering the magnetic attraction force required for the lifting plate 12 to settle towards the lowest position, four magnets are used as an example. The number and placement of the magnets 94 can be adjusted according to actual needs, without limitation herein.

In this embodiment, the elastic module E comprises a pushing element E1, a first elastic element E2, and a second elastic element E3. The pushing element E1 is slidably sleeved on the first shaft rod 21 and the second shaft rod 22 and is movably engaged with the first transmission element 4 and the second transmission element 7. The pushing element E1 includes a first driven cam E11 and a second driven cam E12. Both of first driven cam E11 and the second driven cam E12 are hollow end-cams respectively sleeved on the first shaft rod 21 and the second shaft rod 22. On the other hand, the first elastic element E2 sleeves on the first shaft rod 21, and the second elastic element E3 sleeves on the second shaft rod 22. Two ends of the first elastic element E2 abut against the first ear portion 24 and the first driven cam E11 respectively, while two ends of the second elastic element E3 abut against the second ear portion 25 and the second driven cam E12 respectively.

Figure 14:
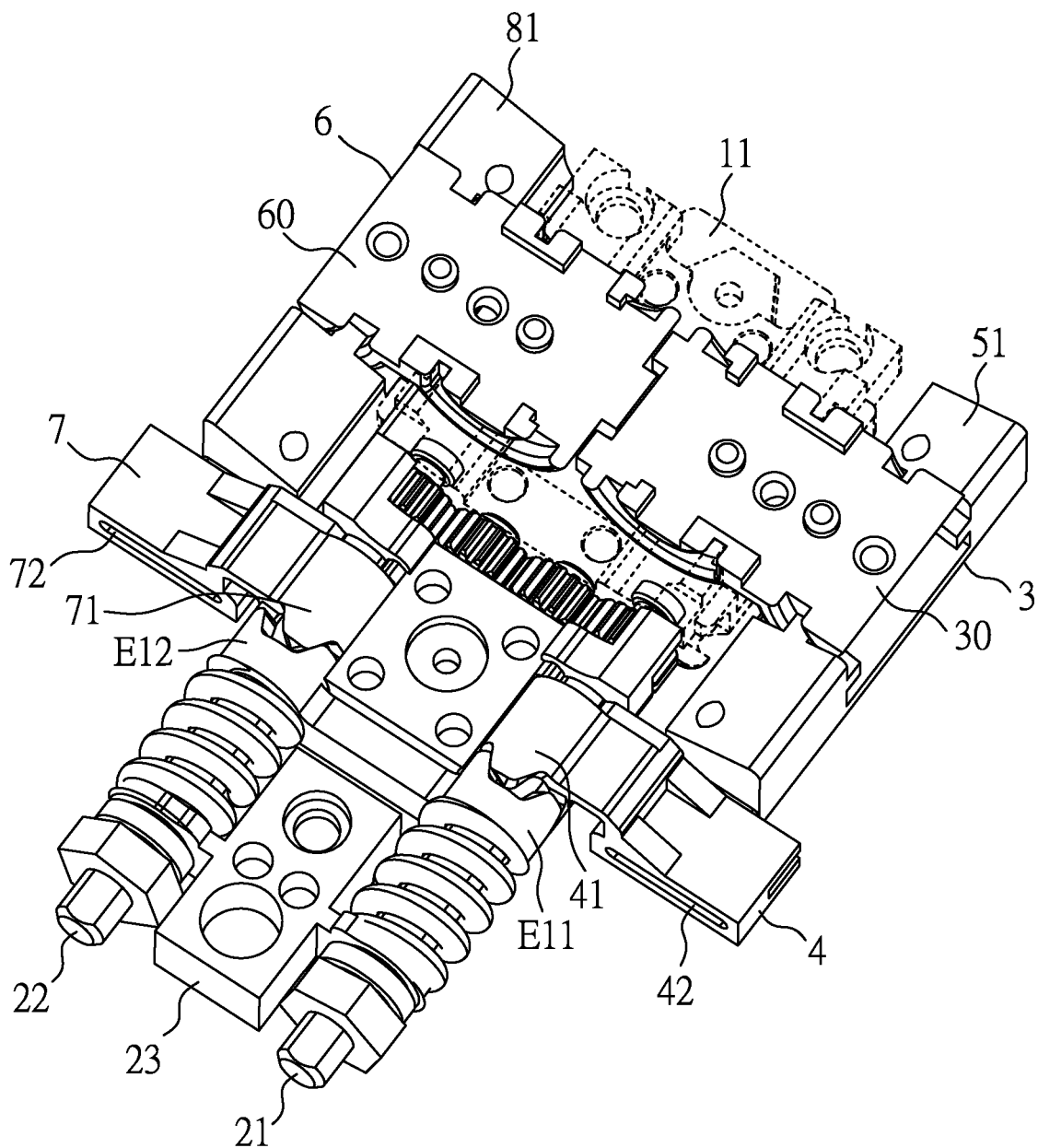
FIG. 14 is a partial schematic view showing the operation of the foldable electronic device according to the present invention.

Next, the operation of the elastic module E is specifically explained as below. Please refer to FIG. 14 and FIG. 15. The first driving cam 41 of the first transmission element 4 and the second driving cam 71 of the second transmission element 7 respectively engage with the first driven cam E11 and the second driven cam E12. When the first bearing element 51 and the second bearing element 81 are in a half-open state between the unfolded state and the folded state, rotating the first transmission element 4 and the second transmission element 7 will drive the first bearing element 51, the second bearing element 81, the first wing 3, and the second wing 6 to pivot. The abutting extent between the first driving cam 41 of the first transmission element 4 and the first driven cam E11, as well as the abutting extent between the second driving cam 71 of the second transmission element 7 and the second driven cam E12, will increase (i.e., the combined length of the first driving cam 41 and the first driven cam E11 along the first axis L1 will increase, and the combined length of the second driving cam 71 and the second driven cam E12 along the second axis L2 will increase), thereby compressing the first elastic element E2 and the second elastic element E3. As a result, the extent of compression of the first elastic element E2 and the second elastic element E3 will increase. In other words, when the first bearing element 51 and the second bearing element 81 are in the unfolded state or the folded state, the first elastic element E2 and the second elastic element E3 will correspondingly be released. In this embodiment, the first elastic element E2 and the second elastic element E3 are pre-loaded compression springs, constantly and jointly providing an elastic force between the fixing element 23 and the first driven cam E11 and the second driven cam E12. In other embodiments of the present invention, other types of springs may be applied without limitation herein.

In this embodiment, the first axis L1, the first outer virtual axis X2, the first inner virtual axis X1, the second axis L2, the second outer virtual axis Y2 and the second inner virtual axis Y1 are all parallel and do not overlap each other (relative to the main body portion 11).

The operation of the foldable electronic device 1000 in the unfolded state and folded state is described in detail as below. When the first panel body 5 and the second panel body 8 are switched from the unfolded state to the folded state, the first inner arc-shaped sliders 13 and the second inner arc-shaped sliders 14 of the central body 1 respectively rotate in the first inner arc-shaped grooves 32 of the first wing 3 and the second inner arc-shaped grooves 62 of the second wing 6, so as to drive the first outer arc-shaped grooves 33 of the first wing 3 and the second outer arc-shaped grooves 63 of the second wing 6 to rotate relative to the first outer arc-shaped sliders 52 of the first panel body 5 and the second outer arc-shaped sliders 82 of the second panel body 8, respectively. Then, the first extending plate 511 and the first sliding column 512 of the first bearing element 51 and the second extending plate 811 and the second sliding column 812 of the second bearing element 81 slide in the first receiving groove 42 of the first transmission element 4 and the second receiving groove 72 of the second transmission element 7, respectively. Finally, the first transmission element 4 and the second transmission element 7 are driven to pivot reversely relative to the main body portion 11. Specifically, the first wing 3 and the second wing 6 respectively pivot about the first inner virtual axis X1 and the second inner virtual axis Y1 relative to the main body portion 11 by a first angle θ1, causing the flexible screen 2000 to bend into a water-droplet-shaped curved surface, and the first support plate 31 and the second support plate 61 are not parallel (gradually converge towards each other in a direction away from the lifting plate 12). In detail, when the first support plate 31 and the second support plate 61 rotate relative to the main body portion 11 by the first angle θ1, at this time, the first panel body 5 and the second panel body 8 respectively form a second angle θ2 with the main body portion 11. Similarly, the first transmission element 4 and the second transmission element 7 pivot by the second angle θ2 relative to the first shaft rod 21 and the second shaft rod 22, respectively. The first angle θ1 is greater than the second angle θ2. Based on the consideration of structural stability and smooth rotation, the first angle θ1 is greater than 90 degrees, and the second angle θ2 is 90 degrees, preferably.

Practically, another set of central body 1, connecting module 2, first wing 3, first transmission element 4, second wing 6, second transmission element 7, synchronous engaging module 9 and elastic module E can be configured in the corresponding bendable area 2001 of the flexible screen 2000, in order to collectively generate the aforementioned functions. Since the operating way is the same, it will not be repeated here.

In summary, the present invention of a folding electronic device utilizes a flexible screen in conjunction with four-bar linkage structures containing wings, bearing elements, transmission elements, and a central body, with the aid of a downwards magnetic force provided by magnets, and with the design of two arc-shaped grooves on the first and second wings for the arc-shaped sliders to pivot, to switch the first panel body and second panel body between the unfolded state and the folded state, and also with the magnetic force to attract the lifting plate, so that the smoothness of the operation of the folding electronic device for users is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A foldable electronic device, comprising:
a central body including a main body portion, a lifting plate, at least one first inner arc-shaped slider, and at least one second inner arc-shaped slider, wherein the first inner arc-shaped slider and the second inner arc-shaped slider are respectively formed in the main body portion by intervals, and the lifting plate is movably arranged in the main body portion and movable between a highest position and a lowest position;
a connecting module arranged in the central body and including a first shaft rod and a second shaft rod respectively inserted into the main body portion, wherein the first shaft rod extends along a first axis and has a first main gear, and the second shaft rod extends along a second axis and has a second main gear;
a first wing including a first support plate, at least one first inner arc-shaped groove, and at least one first outer arc-shaped groove, wherein the first support plate is movably arranged on one side of the lifting plate, and the first inner arc-shaped slider is slidably arranged in the first inner arc-shaped groove, so that the first wing is pivotable relative to the main body portion with a first inner virtual axis as a center;
a first transmission element sleeved on the first shaft rod and synchronously rotating with the first shaft rod;
a first panel body including a first bearing element capable of linear sliding relative to the first transmission element and having at least one first outer arc-shaped slider, wherein the first outer arc-shaped slider is slidably arranged in the first outer arc-shaped groove, thereby allowing the first bearing element to pivot relative to the first wing about a first outer virtual axis;
a second wing including a second support plate, at least one second inner arc-shaped groove, and at least one second outer arc-shaped groove, wherein the second support plate is movably arranged on the opposite side of the lifting plate, and the second inner arc-shaped slider is slidably arranged in the second inner arc-shaped groove, so that the second wing is pivotable relative to the main body portion with a second inner virtual axis as a center;
a second transmission element sleeved on the second shaft rod and synchronously rotating with the second shaft rod;
a second panel body including a second bearing element capable of linear sliding relative to the second transmission element and having at least one second outer arc-shaped slider, wherein the second outer arc-shaped slider is slidably arranged in the second outer arc-shaped groove, thereby allowing the second bearing element to pivot relative to the second wing about a second outer virtual axis;
a synchronous engaging module including a synchronous supporting block, a first auxiliary gear and a second auxiliary gear, wherein two ends of the synchronous supporting block are respectively sleeved on the first shaft rod and the second shaft rod, and the first and second auxiliary gears are reversely rotatably disposed on the synchronous supporting block and mesh with each other, and wherein the first auxiliary gear meshes with the first main gear in a reversely rotatable manner, and the second auxiliary gear meshes with the second main gear in a reversely rotatable manner, thereby enabling the first transmission element and second transmission element to synchronously and reversely rotate;
an elastic module including a pushing element slidably sleeved on the first shaft rod and the second shaft rod and movably engaged with the first transmission element and the second transmission element; and
a flexible screen disposed on the first panel body and the second panel body and including a bendable area;
wherein the first panel body and the second panel body are capable of switching between an unfolded state and a folded state, wherein when the first panel body and the second panel body are in the unfolded state, the flexible screen is flattened, the lifting plate is at the highest position, and the first support plate, the second support plate, and the lifting plate jointly support the bendable area, and wherein when the first panel body and the second panel body are in the folded state, the flexible screen is bent, the lifting plate is at the lowest position, and the first support plate, the second support plate, and the lifting plate jointly define a yielding space for accommodating the bendable area.

2. The foldable electronic device as claimed in claim 1, wherein when the first panel body and the second panel body are in the unfolded state, the first support plate and the second support plate are substantially coplanar with the lifting plate; and when the first panel body and the second panel body are in the folded state, the first panel body and the second panel body are substantially parallel to and spaced apart from each other, and the first support plate and the second support plate are not parallel to the lifting plate so as to collectively define the yielding space.

3. The foldable electronic device as claimed in claim 2, wherein when the first panel body and the second panel body are switched from the unfolded state to the folded state, the first wing and the second wing rotate relative to the main body portion about the first inner virtual axis and the second inner virtual axis at a first angle respectively, and the first panel body and the second panel body rotate relative to the main body portion at a second angle respectively, and wherein the first angle is greater than the second angle.

4. The foldable electronic device as claimed in claim 3, wherein the first bearing element further has a first extending plate and a first sliding column, and the first transmission element includes a first receiving groove extending substantially perpendicular to the first axis, and the first extending plate and the first sliding column are extending along the first axis and slidably disposed in the first receiving groove; and wherein the second bearing element further has a second extending plate and a second sliding column, the second transmission element has a second receiving groove extending substantially perpendicular to the second axis, and the second extending plate and the second sliding column are extending along the second axis and slidably disposed in the second receiving groove.

5. The foldable electronic device as claimed in claim 4, wherein the connecting module further includes a fixing element, a first ear portion and a second ear portion laterally and oppositely extending from the fixing element, the first ear portion is formed with a first shaft hole along the first axis for the first shaft rod to pass through, and the second ear portion is formed with a second shaft hole along the second axis for the second shaft rod to pass through.

6. The foldable electronic device as claimed in claim 5, wherein the pushing element has a first driven cam and a second driven cam sleeved on the first shaft rod and the second shaft rod respectively, and the elastic module further includes a first elastic element and a second elastic element sleeved on the first shaft rod and the second shaft rod respectively, and wherein two ends of the first elastic element abut the first ear portion and first driven cam severally, and two ends of the second elastic element abut the second ear portion and the second driven cam severally.

7. The foldable electronic device as claimed in claim 6, wherein the first transmission element further includes a first driving cam slidably sleeved along the first axis on the first shaft rod and able to rotate synchronously with the first shaft rod, and the second transmission element further includes a second driving cam slidably sleeved along the second axis on the second shaft rod and able to rotate synchronously with the second shaft rod, wherein the first driving cam and the second driving cam respectively mate with the first driven cam and the second driven cam, and wherein when the first bearing element and the second bearing element are in a half-folded state between the unfolded state and the folded state, the first driving cam and the second driving cam abut against the first driven cam and the second driven cam, respectively, thereby compressing the first elastic element and the second elastic element, and when the first bearing element and the second bearing element are in the unfolded state or in the folded state, the first elastic element and second elastic element are correspondingly released.

8. The foldable electronic device as claimed in claim 7, wherein the lifting plate further has a locking element, a nut and a screw hole, the central body further includes a stopper portion, the nut is disposed inside the central body, and the locking element passes through the screw hole and is screwed into the nut, and wherein when the lifting plate is lifted to the highest position relative to the central body, the nut interferes with the stopper portion.

9. The foldable electronic device as claimed in claim 8, wherein the first elastic element and the second elastic element are compression springs.

10. The foldable electronic device as claimed in claim 1, wherein the first support plate and the second support plate have at least one first protruding portion and at least one second protruding portion respectively, and the lifting plate further has at least one first recess and at least one second recess, wherein the first recess corresponds to the first protruding portion and the second recess corresponds to the second protruding portion, and wherein when the first panel body and the second panel body switch from the unfolded state to the folded state, the first protruding portion and the second protruding portion are able to abut against the first recess and the second recess, respectively, for compressing the lifting plate, so as to keep the lifting plate at the lowest position.

11. The foldable electronic device as claimed in claim 10, wherein the first support plate further has at least one first abutting portion, and the second support plate further has at least one second abutting portion, and wherein when the first bearing element and the second bearing element are in the unfolded state, the first abutting portion, the second abutting portion, the first wing and the second wing collectively lift the lifting plate to the highest position.

12. The foldable electronic device as claimed in claim 11, wherein the synchronous engaging module further includes at least one magnet disposed on the synchronous support block and constantly providing a magnetic attraction force to the lifting plate, thereby making the lifting plate tend to settle towards the lowest position.

13. The foldable electronic device as claimed in claim 12, wherein the first axis, the first outer virtual axis, the first inner virtual axis, the second axis, the second outer virtual axis, and the second inner virtual axis are all parallel to each other.

* * * * *